No. 849,571. PATENTED APR. 9, 1907.
G. H. REYNOLDS.
PIPE BENDING MACHINE.
APPLICATION FILED DEC. 22, 1905.

6 SHEETS—SHEET 1.

Witnesses:

Inventor:
George H Reynolds

No. 849,571. PATENTED APR. 9, 1907.
G. H. REYNOLDS.
PIPE BENDING MACHINE.
APPLICATION FILED DEC. 22, 1905.

6 SHEETS—SHEET 2.

Witnesses:

Inventor:
George H Reynolds

No. 849,571. PATENTED APR. 9, 1907.
G. H. REYNOLDS.
PIPE BENDING MACHINE.
APPLICATION FILED DEC. 22, 1905.

6 SHEETS—SHEET 3.

No. 849,571. PATENTED APR. 9, 1907.
G. H. REYNOLDS.
PIPE BENDING MACHINE.
APPLICATION FILED DEC. 22, 1905.

6 SHEETS—SHEET 4.

Witnesses:
Henry Drury
A. M. Kelly

Inventor:
George H. Reynolds
By his atty

No. 849,571.
PATENTED APR. 9, 1907.
G. H. REYNOLDS.
PIPE BENDING MACHINE.
APPLICATION FILED DEC. 22, 1905.
6 SHEETS—SHEET 5.
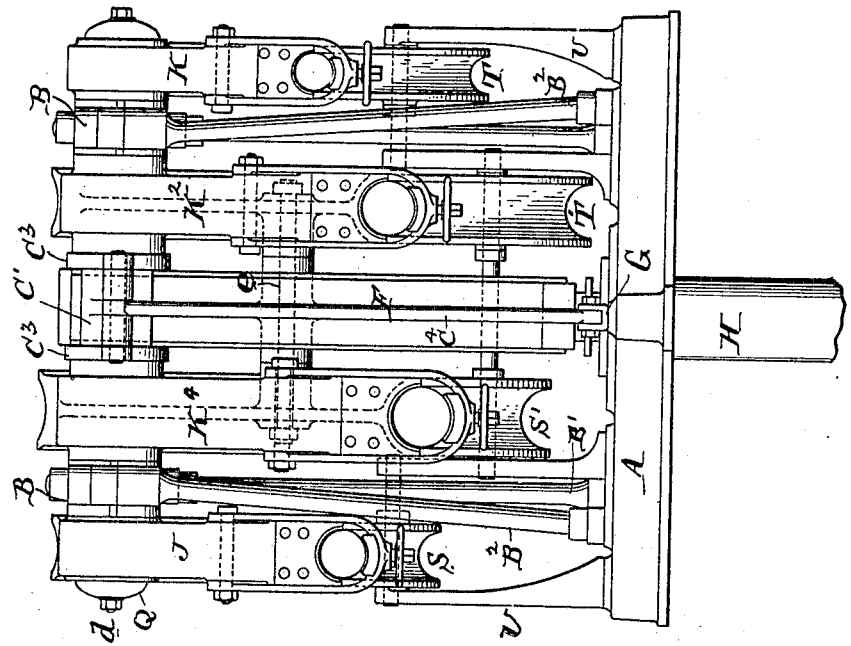
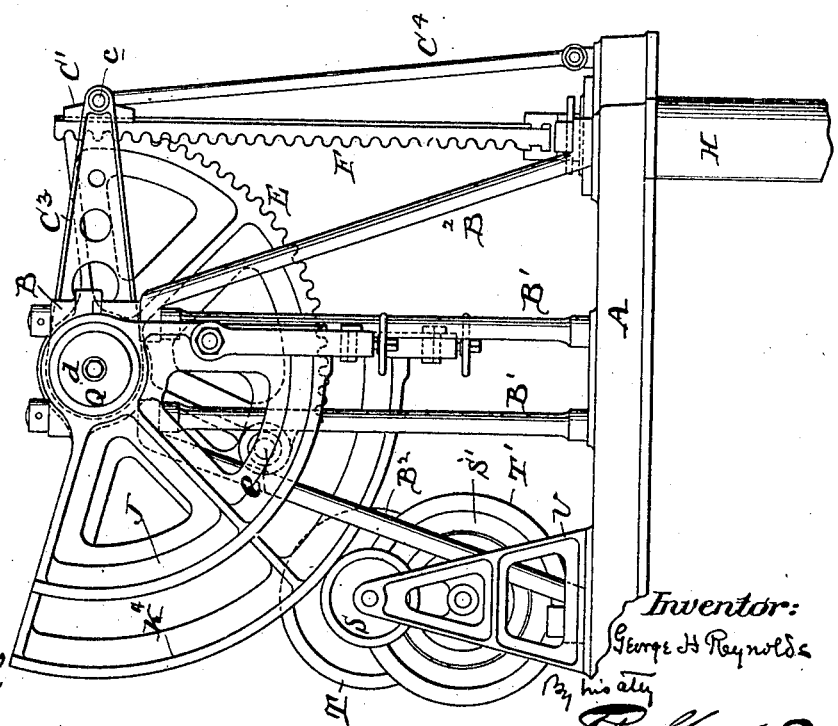

UNITED STATES PATENT OFFICE.

GEORGE H. REYNOLDS, OF MANSFIELD DEPOT, CONNECTICUT, ASSIGNOR TO THE PIPE BENDING MACHINE COMPANY, A CORPORATION OF NORTH CAROLINA.

PIPE-BENDING MACHINE.

No. 849,571.  Specification of Letters Patent.  Patented April 9, 1907.

Application filed December 22, 1905. Serial No. 292,901.

*To all whom it may concern:*

Be it known that I, GEORGE H. REYNOLDS, of Mansfield Depot, county of Tolland, and State of Connecticut, have invented an Improvement in Pipe-Bending Machines, of which the following is a specification.

My invention has reference to pipe-bending machines, and consists of certain improvements which are fully set forth in the following specification, and shown in the accompanying drawings, which form a part thereof.

The object of my invention is to provide a suitable construction of machine adapted for bending pipes, and especially those of large diameters.

My invention consists of a rock-shaft upon which is secured a forming sector or frame, preferably grooved, and upon which the pipe is bent, combined with guiding and supporting means for supporting the unbent portion of the pipe during the bending operation, and power devices, preferably of hydraulic type, for rocking the rock-shaft and forming-sector.

My invention further consists in providing the rock-shaft with two or more such forming-sectors and between which the power is applied for rocking the rock-shaft, the said sectors being of a different radii and adapted to pipes of different diameters, whereby the same machine may have capacity for bending pipes of different sizes.

More specifically, my invention consists in providing the forming-sectors with suitable clamping devices at the forward end of their bending surface or groove, whereby the flanged end of the pipe may be clamped to the sector, and thereby caused to be moved with the sector during its rotation for bending the pipe.

My invention also embodies many details of construction which, together with the features above specified, will be better understood by reference to the drawings, in which—

Figure 1:
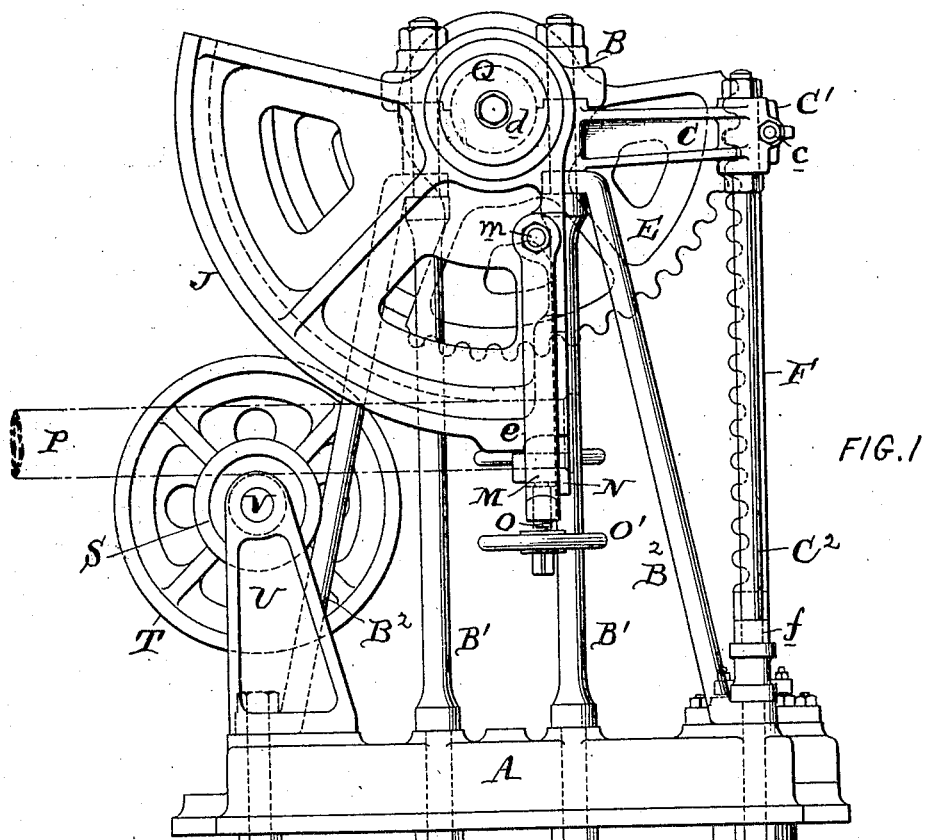
Figure 4:
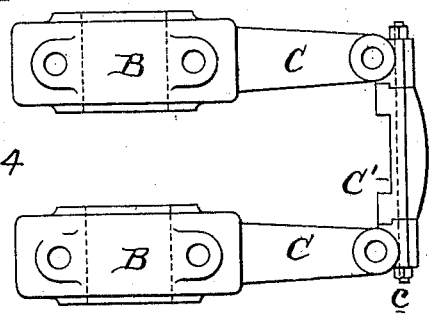
Figure 5:
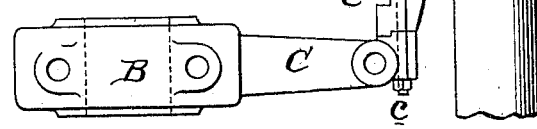
Figure 2:
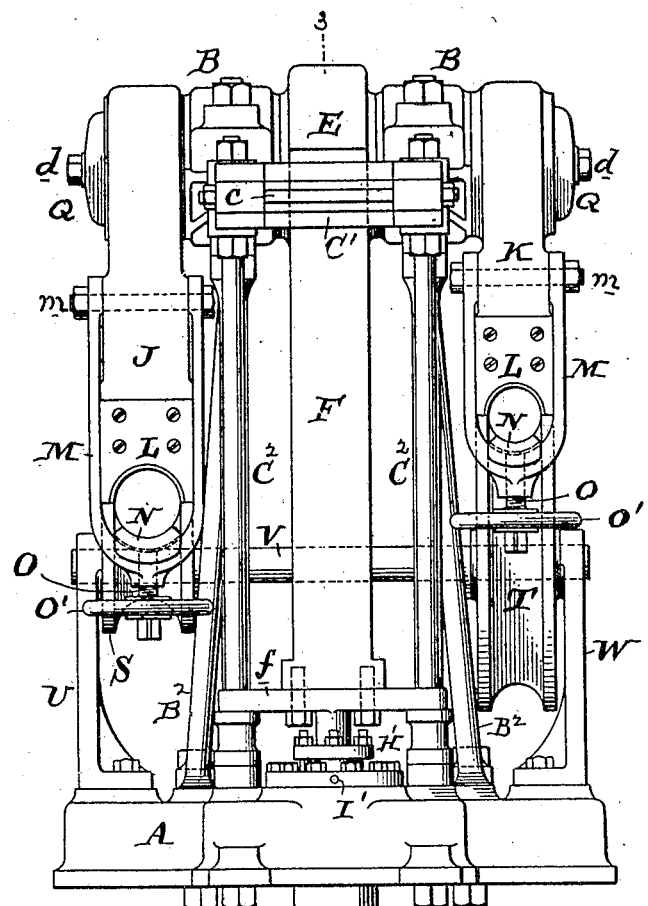
Figure 3:
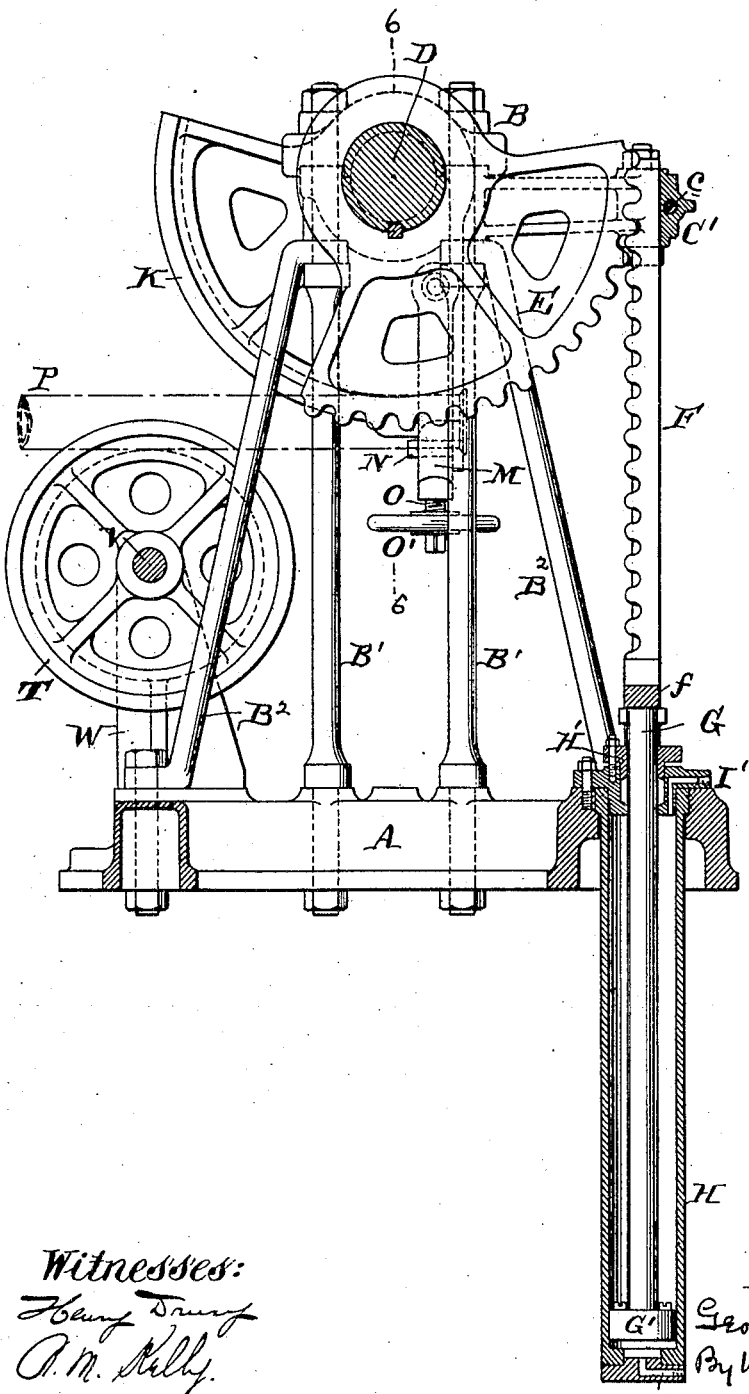
Figure 6:
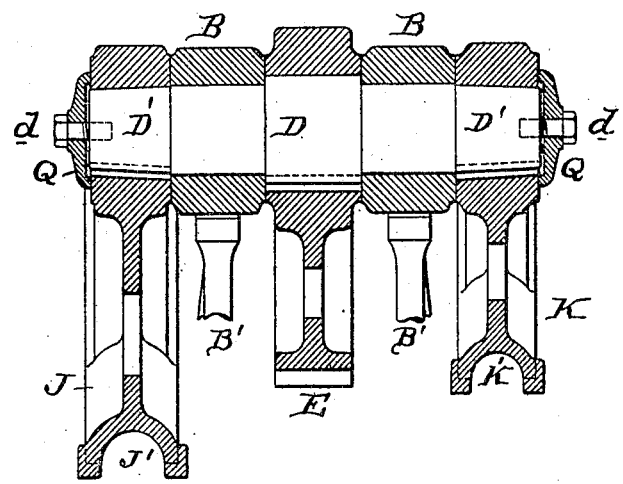
Figure 7:
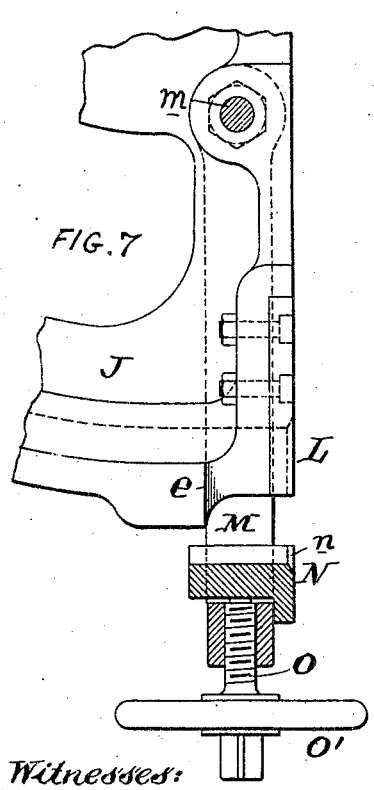
Figure 8:
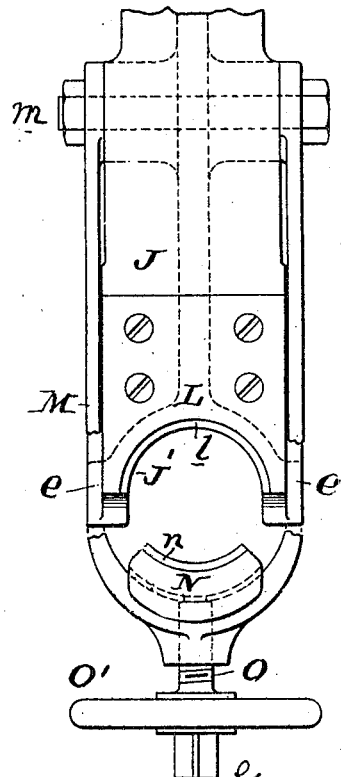
Figure 9:
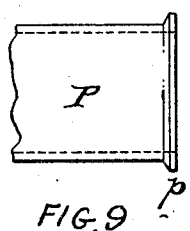
Figure 12:
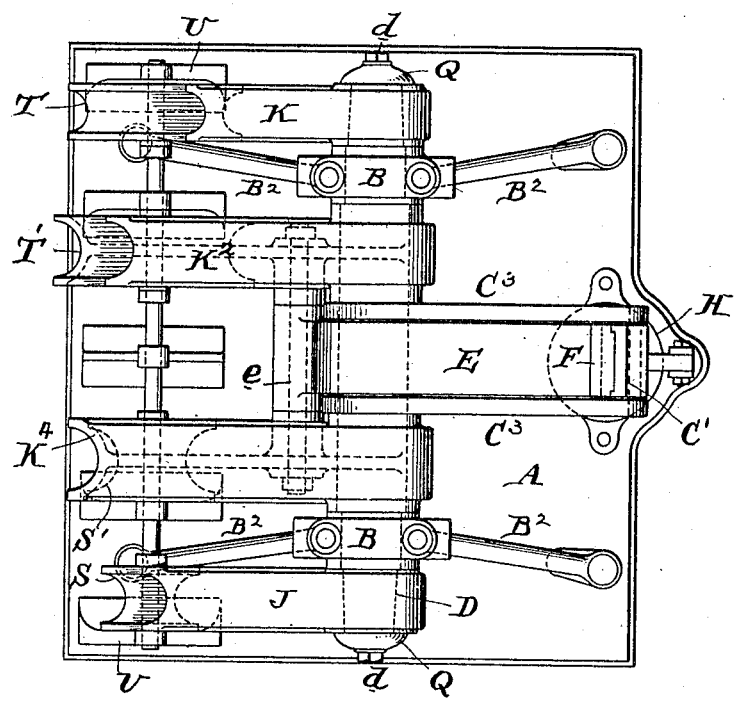

Figure 1 is a side elevation of a pipe-bending machine embodying my improvements. Fig. 2 is a rear elevation of the same. Fig. 3 is a vertical section of the same on line 3 3 of Fig. 2. Fig. 4 is a plan view, and Fig. 5 is a side elevation, of the bearings for the rock-shaft. Fig. 6 is a vertical section of the upper part of the machine on the line of the rock-shaft, taken on line 6 6 of Fig. 3. Fig. 7 is a side elevation of a portion of the forming-sector with the clamp in section. Fig. 8 is a front view of the lower portion of the sector and clamp. Fig. 9 is an elevation of a portion of a flanged pipe end. Fig. 10 is a side elevation, and Fig. 11 a rear elevation, of a modified form of my invention; and Fig. 12 is a plan view of the same.

A is the bed-plate of the machine.

B B are the bearings for the rock-shaft D and are supported and secured to the bed-plate by the upright posts B' B' and oblique ties B². The bearings B have laterally-extending arms C, connected at their outer ends by the transverse guide-frame C'. The parts C, C, and C' are secured together by the transverse bolt c. The rock-shaft D has keyed to it, between the bearings B B, a segmental gear E, which meshes with a vertically-reciprocating rack F, guided in the guide C' and reciprocated by the piston-rod G and piston G', working in a hydraulic cylinder H. This cylinder is flanged at the top and by which it is bolted to the bed-plate, the cylinder itself extending through the bed-plate and below the same, as clearly shown in Fig. 3. The piston-rod extends through a stuffing-box H' and is provided with a cross-head *f*, to which the rack F is bolted, as shown in Fig. 2. The cross-head *f* is guided upon two upright rods C² C², connecting the lateral arms C C with the bed-plate, and performing the dual function of cross-head guides and supporting-ties to the said arms.

Water is forced into the cylinder H by an inlet I to raise the piston and piston-rod, and by an inlet I' to lower the piston and piston-rod. In this manner the rack F may be reciprocated, being raised when bending a pipe and lowered when returning the parts to their initial position. The means for controlling the water to and from the cylinder H, I have not shown, as such means may be of any simple construction and readily adapted by one skilled in the art of hydraulic machines.

The ends of the shaft D beyond the bearings B B are tapered and receive the forming-sectors J and K, the former being of greater diameter than the latter. These sectors are rigidly secured to the shaft, so as to rock with it, by means of keys, and are detachably held in position by the caps Q and screws *d*. It is thus easy to remove the sectors to replace them with others of different diameters and adapted to pipes of various sizes. These sectors J and K are respectively provided with grooves J' and K' in their peripheries, said grooves being of the diameters of the pipes to be bent. Ordinarily the sectors of largest diameters will have grooves of largest diameter, and vice versa. The forward end of each of these sectors is provided with steel jaws L and N, the latter being carried by a yoke M, hinged to the sector above the jaw L at $m$ and adjustable to or from the jaws L by a screw O and hand-wheel O', carried by the yoke, as clearly shown in Figs. 7 and 8. The yoke M is free to be turned forward upon its hinge $m$, but is held against backward movement by the shoulders $e$ on the sectors. The end of the pipe P is inserted between the jaws L N and clamped in position so that its flange $p$ rests against the forward faces of the said jaws. The jaw L is beveled at $l$, and the jaw N at $n$, to fit properly to the rear of the pipe-flange $p$, so as to enable the pipe to be positively gripped and held without danger of injuring the end thereof. Other means for clamping the pipe to the forward end of the forming-sectors may be employed, as there are many expedients for accomplishing this result which will occur to one skilled in the art.

In the particular form of machine here shown the segmental gear E is secured to the shaft D in angular advance relatively to the forming-sectors J K, but that may be varied to suit the position of the hydraulic cylinder H should it be desired to arrange it in any other position upon the bed-plate.

S and T are two grooved wheels, carried upon a shaft V, supported in standards V W, bolted to the bed-plate, and said wheels act as guides for the pipes, as indicated in Figs. 1 and 3. The grooved wheel T, which is used in connection with the sector K, is of larger diameter than the wheel S, which operates in conjunction with the sector J, the said diameters being inversely proportional to the radii of the sectors. This is only required because both wheels are journaled upon the same shaft V. It is evident that by otherwise supporting these wheels S T they may be made of any diameter desired. The position of these grooved wheels is slightly to the rear of the rock-shaft D and at a lower level than the sectors, so that the pipe resting upon the guide-wheel may be horizontal when the forward end of the pipe is clamped to the sector prior to the bending operation. These wheels support the pipe against downward thrust during the bending operation and while the pipe is being drawn over them by the advancing forming-sector.

To secure the bending of the pipe when the parts are in the position shown in Figs. 1 and 3, the water is forced into the inlet I of the cylinder H, the piston, piston-rod, and rack F is raised, the shaft D rocked, and the forming-sectors advanced. The pipe is bent around the periphery of the forming-sectors J or K and is drawn over the guide-wheels S or T, as the case may be, and when the bending is completed, the jaw N is released and the yoke swung over the end of the pipe and the pipe removed.

The pipe may be bent in the heated or cold state, as desired.

It is evident that the sectors J K may be of any radius, have any diameter of groove, and may have circumferential length. They would be made in size and shape to suit the character of work to be done, so that I do not limit myself to any of these dimensions.

The machine which I have described is provided with two bending-sectors; but it is evident that it may contain more than two such bending-sectors, as shown in Figs. 10, 11, and 12, which illustrate a modified form of my improved machine. In this modified form of machine I employ two additional bending-sectors $K^4$ and $K^2$, which give to the machine capacity for bending four sizes of pipe into bends of different curvature. In this case the segmental gear E is not only keyed to the shaft D, but is also bolted to the bending-segments $K^4$ $K^2$ upon its opposite sides by the transverse bolt $e$, and all of these parts are located between the two bearings B B. The guide or cross frame C' in this construction is secured to the two radius-arms $C^3$ $C^3$, sleeved upon the shaft D, and is also held in position by the oblique rod $C^4$, connecting it to the bed-plate A. The rack F is guided by the cross-frame C', but has no guides $C^2$, as in the type of machine first described. The outer bending-segments J K and their guide-wheels S T are the same as before, but the bending-segments $K^4$ $K^2$ are respectively provided with guide-wheels S' and T', which are supported by the bed-plate upon suitable bearings. It will be seen that this machine has greater capacity than that first described, but differs from it only in the addition of the two bending-sectors $K^4$ $K^2$ and in connecting the arms $C^3$ $C^3$ directly with the shaft D in place of the bearings B, as shown at C in Fig. 4.

By bolting the gear E directly to the two inner and larger bending-sectors at $e$ the application of power to said sectors and also to the shaft D is greatly increased and more positive.

While I have shown in the drawings a form of my invention which I have designed for commercial use and which I deem excellently adapted for the purposes thereof, I do not restrict myself to the details, as they may be varied in many ways without departing from the spirit of the invention.

Having now described my invention, what I claim as new, and desire to secure by Letters Patent, is—

1. In a pipe-bending machine, a rocking sector having a curved and grooved perimeter and shoulders e near its forward end, combined with a yoke hinged to its forward end and resting against the shoulders e, a clamping-jaw carried within the yoke and movable to or from the groove in the sector, and an adjusting-screw carried by the yoke for adjusting the clamping-jaw.

2. In a pipe-bending machine, the combination of a frame having two bearings, a rock-shaft journaled in the bearings, power devices operating on the rock-shaft between the bearings for rocking it, bending-sectors secured to each end of the rock-shaft outside of the bearings, and guides for the pipes respectively arranged in line with the sectors.

3. In a pipe-bending machine, the combination of a frame having two bearings, a rock-shaft journaled in the bearings, power devices operating on the rock-shaft between the bearings for rocking it, bending-sectors secured to each end of the rock-shaft outside of the bearings one of the sectors being of greater radius than the other, and guides for the pipes respectively arranged in line with the sectors consisting of grooved wheels loosely supported and in which the wheel of greatest radius is in line with the sector of smallest radius and vice versa.

4. In a pipe-bending machine, the combination of a frame having two bearings, a rock-shaft journaled in the bearings, power devices operating on the rock-shaft between the bearings for rocking it, bending-sectors secured to each end of the rock-shaft outside of the bearings, clamping devices upon each of the sectors at the forward end for clamping the pipe, and guides for the pipes respectively arranged in line with the sectors.

5. In a pipe-bending machine, the bed-plate, two bearings B B having lateral arms C and connecting cross-frame C', independent upright posts B' B² and C² for connecting the bearings to the bed-plate, a rock-shaft journaled in the bearings, means secured to the rock-shaft for bending the pipe, and power means for rocking the rock-shaft.

6. In a pipe-bending machine, the bed-plate, two bearings B B, upright posts B' for connecting the bearings to the bed-plate, a rock-shaft journaled in the bearings, means secured to the rock-shaft for bending the pipe, a gear secured to the rock-shaft, a reciprocating rack meshing with the gear, a cross-frame C' holding the rack to the gear, lateral arms for holding the cross-guide C' to the rock-shaft, connecting means between the guide C' and the bed-plate to prevent it traveling about the rock-shaft, a hydraulic cylinder below the rack secured to the bed-plate, a piston and piston-rod for the cylinder having a cross-head guided on the upright rods and secured to the rack.

7. In a pipe-bending machine, the combination of a frame having two bearings, a rock-shaft journaled in the bearings, power devices operating on the rock-shaft between the bearings for rocking it, bending-sectors having grooved peripheries secured to the rock-shaft between the bearings and power devices, and guides for the pipes arranged respectively in line with the sectors.

8. In a pipe-bending machine, the combination of a frame having two bearings, a rock-shaft journaled in the bearings, power devices operating on the rock-shaft between the bearings for rocking it, bending-sectors having grooved peripheries secured to the rock-shaft between the bearings and power devices and one sector being of greater radius than the other, and guides for the pipes arranged respectively in line with the sectors consisting of grooved wheels loosely supported and in which the wheel of greatest radius is in line with the sector of smallest radius and vice versa.

9. In a pipe-bending machine, the combination of a frame having two bearings, a rock-shaft journaled in the bearings, power devices operating on the rock-shaft between the bearings for rocking it, bending-sectors secured to the rock-shaft between the bearings and power devices, clamping devices upon each of the sectors at the forward end for clamping the pipe, and guides for the pipe arranged respectively in line with the sectors.

10. In a pipe-bending machine, the combination of a frame having two bearings, a rock-shaft journaled in the bearings, power devices operating on the rock-shaft between the bearings for rocking it consisting of a gear on the rock-shaft and a reciprocating rack meshing with the gear, bending-sectors secured to the rock-shaft between the bearings and power devices, a transverse bolt securing the sectors and gear together, and guides for the pipes arranged respectively in line with the sectors.

11. In a pipe-bending machine, a rock-shaft, four bending-sectors secured to the rock-shaft, bearings for the rock-shaft between the two sectors at each end of the rock-shaft, and power devices for rocking the rock-shaft arranged intermediate of the two middle bending-sectors.

12. In a pipe-bending machine, a rock-shaft, four bending-sectors secured to the rock-shaft, bearings for the rock-shaft between the two sectors at each end of the rock-shaft, and power devices for rocking the rock-shaft arranged upon the rock-shaft intermediate of the two middle bending-sectors and secured directly to them.

In testimony of which invention I hereunto set my hand.

GEORGE H. REYNOLDS.

Witnesses:
R. M. HUNTER,
R. M. KELLY.